(12) United States Patent
Aoki et al.

(10) Patent No.: US 7,114,768 B2
(45) Date of Patent: Oct. 3, 2006

(54) SUNROOF APPARATUS FOR A VEHICLE

(75) Inventors: Kuniyasu Aoki, Tochigi (JP); Akira Murasawa, Tochigi (JP); Shigehito Horiuti, Tochigi (JP); Masaharu Ohnishi, Saitama (JP); Shuhei Hamada, Saitama (JP); Takashi Ueno, Saitama (JP); Makoto Kurita, Saitama (JP)

(73) Assignees: Yachiyo Kogyo Kabushiki Kaisya, Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/099,928

(22) Filed: Apr. 5, 2005

(65) Prior Publication Data

US 2005/0218703 A1    Oct. 6, 2005

(30) Foreign Application Priority Data

Apr. 5, 2004    (JP)    ............................. 2004-111425

(51) Int. Cl.
B60J 10/12    (2006.01)

(52) U.S. Cl. .................................................. 296/216.09

(58) Field of Classification Search ........... 296/216.06, 296/216.09
See application file for complete search history.

(56) References Cited

U.S. PATENT DOCUMENTS 4,553,307 A * 11/1985 Kaltz et al. .................... 29/434
4,783,117 A * 11/1988 Nagata .................... 296/216.09
6,837,538 B1 * 1/2005 Itoh et al. ............... 296/216.06

FOREIGN PATENT DOCUMENTS

GB    2212116    * 7/1989    ............ 296/216.09
JP    11-321339    11/1999

* cited by examiner

*Primary Examiner*—Dennis H. Pedder
(74) *Attorney, Agent, or Firm*—Fish & Richardson P.C.

(57) ABSTRACT

A sunroof apparatus for a vehicle includes a sunroof panel, a panel holder, a lip member, a sealing member and a lip for wind noise. The panel holder supports the sunroof panel internally relative to a cabin of the vehicle. The lip member is attached to an end portion of the panel holder. The sealing member is attached to the lip member. The lip for wind noise extends from the lip member towards inside of the cabin. An end portion of the lip for wind noise is adapted to lie closer to the sunroof panel than an end portion of the panel holder.

6 Claims, 4 Drawing Sheets

SUNROOF APPARATUS FOR A VEHICLE

BACKGROUND OF THE INVENTION

The present invention relates to a sunroof apparatus, and particularly to a sunroof apparatus which has a sealing mechanism for sealing a gap between a sunroof panel and an edge of opening in the roof of a vehicle.

It is known that a sealing member is placed around the periphery of a sunroof panel for sealing a gap between the sunroof panel and an edge of opening of substantially rectangular shape. The sunroof panel is installed in the opening with a hinge about which it can be tilted up. Related arts are disclosed in Japanese Published Patent Application 11-321339.

FIG. 4 is a sectional view showing structure of a conventional sealing mechanism used for a sunroof panel. As shown in FIG. 4, when a sunroof panel 23 of a sunroof apparatus 200, which is supported by a panel holder 27, is tilted up, ventilation of a cabin of a vehicle is conducted in such a manner that air is expelled from the cabin through a passage defined by the sunroof panel 23 and an edge of an opening 21 in a stationary roof 22. A sealing member 24, which is attached to an end portion 23a of the sunroof panel 23, provides sealing between an internal periphery of the opening 21 and the sunroof panel 23. The sealing member 24 has a lip 25 for water drainage around its external periphery, which prevents rainwater from intruding into the cabin. And a channel 28 for water drainage, which is positioned under the lip 25, drains drops of rainwater away.

However, when the sunroof panel 23 is tilted up, the air which is drawn from the inside of cabin during vehicular traveling interferes with the lip 25, inducing noise. This is ascribed to the fact that the air stream having a considerable speed flows through a small passage defined by the lip 25 and the edge of opening 21 in the stationary roof 22.

SUMMARY OF THE INVENTION

The present invention seeks to provide a sunroof apparatus which is able to decrease noise made by air drawn from a cabin of a vehicle through a gap between a tilted-up sunroof panel and an edge of opening in a stationary roof.

It is an aspect of the present invention to provide a sunroof apparatus for a vehicle, which comprises a sunroof panel, a panel holder, a lip member, a sealing member and a lip for wind noise. The panel holder supports the sunroof panel internally relative to a cabin of the vehicle. The lip member is attached to an end portion of the panel holder. The sealing member is attached to the lip member. The lip for wind noise extends from the lip member towards inside of the cabin. An end portion of the lip for wind noise is adapted to lie closer to the sunroof panel than an end portion of the panel holder.

The sunroof apparatus described above, which prevents a steep reduction in volume of a passage for air flow defined by the end portion of lip for wind noise and an edge of opening provided in a stationary roof, is able to reduce noise induced by the air, which is drawn from the inside of cabin.

It is another aspect of the present invention to provide a sunroof apparatus, which further comprises a lip for water drainage. This lip for water drainage is integrally formed with the lip for wind noise and extends from the lip member towards inside of the cabin. Furthermore, the lip for water drainage is adapted to lie closer to the sealing member than the lip for wind noise.

In this way, it is possible not only to prevent rainwater from dropping into the cabin, but also to help increase stiffness of a root of the lip for wind noise because of the integrated formation. Further more it is possible to help to securely attach the sealing member to the panel holder through the lip member.

It is still another aspect to provide a sunroof apparatus, in which the lip for wind noise has a portion of reinforcement at its root. The portion is adapted to lie on a side closer to the sunroof panel.

The sunroof apparatus described above is able to increase the stiffness of the root of lip for wind noise, which helps to securely attach the sealing member to the panel holder.

It is yet another aspect of the present invention to provide a sunroof apparatus, in which the lip for wind noise is adapted to lie closer to the sunroof panel than the end portion of the panel holder.

Because the lip for wind noise is remotely disposed relative to a joint (mating and adhesion) between the sealing member and the lip member, it is possible to increase the stiffness of the lip for wind noise.

DESCRIPTION OF THE PREFERRED EMBODIMENTS

Embodiments of the present invention are now described with reference to the accompanying drawings.

a. First Embodiment

Figure 1:
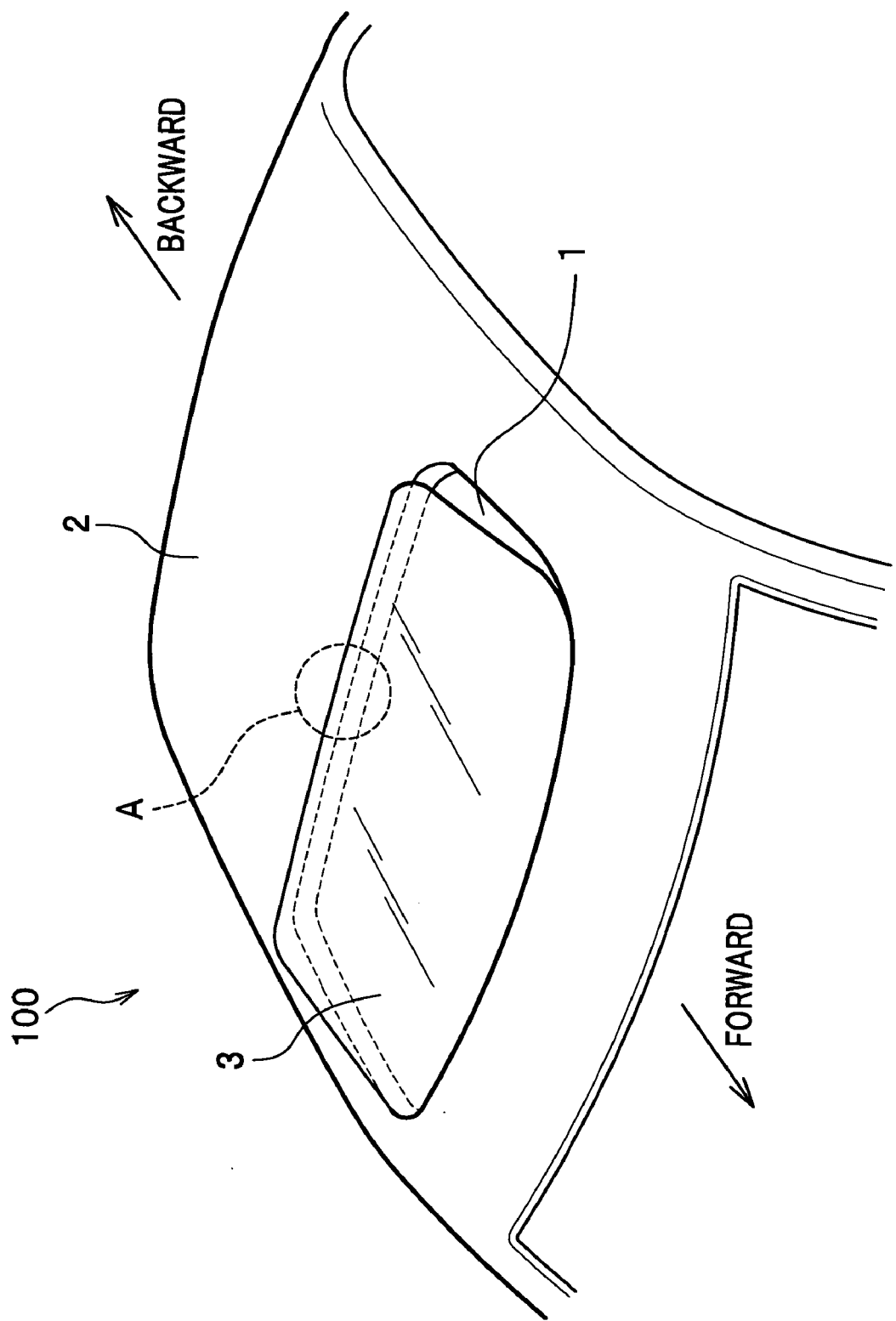
FIG. 1 is a perspective view illustrating a sunroof apparatus for a vehicle having a sunroof panel.

As shown in FIG. 1, a sunroof apparatus 100 has an opening 1 in a stationary roof 2. A sunroof panel 3, which is substantially rectangle, is installed in the opening 1. A side of the sunroof panel 3 is hinged so that it can be tilted up. In FIG. 1 forward and backward directions are indicated with arrows.

Figure 2:
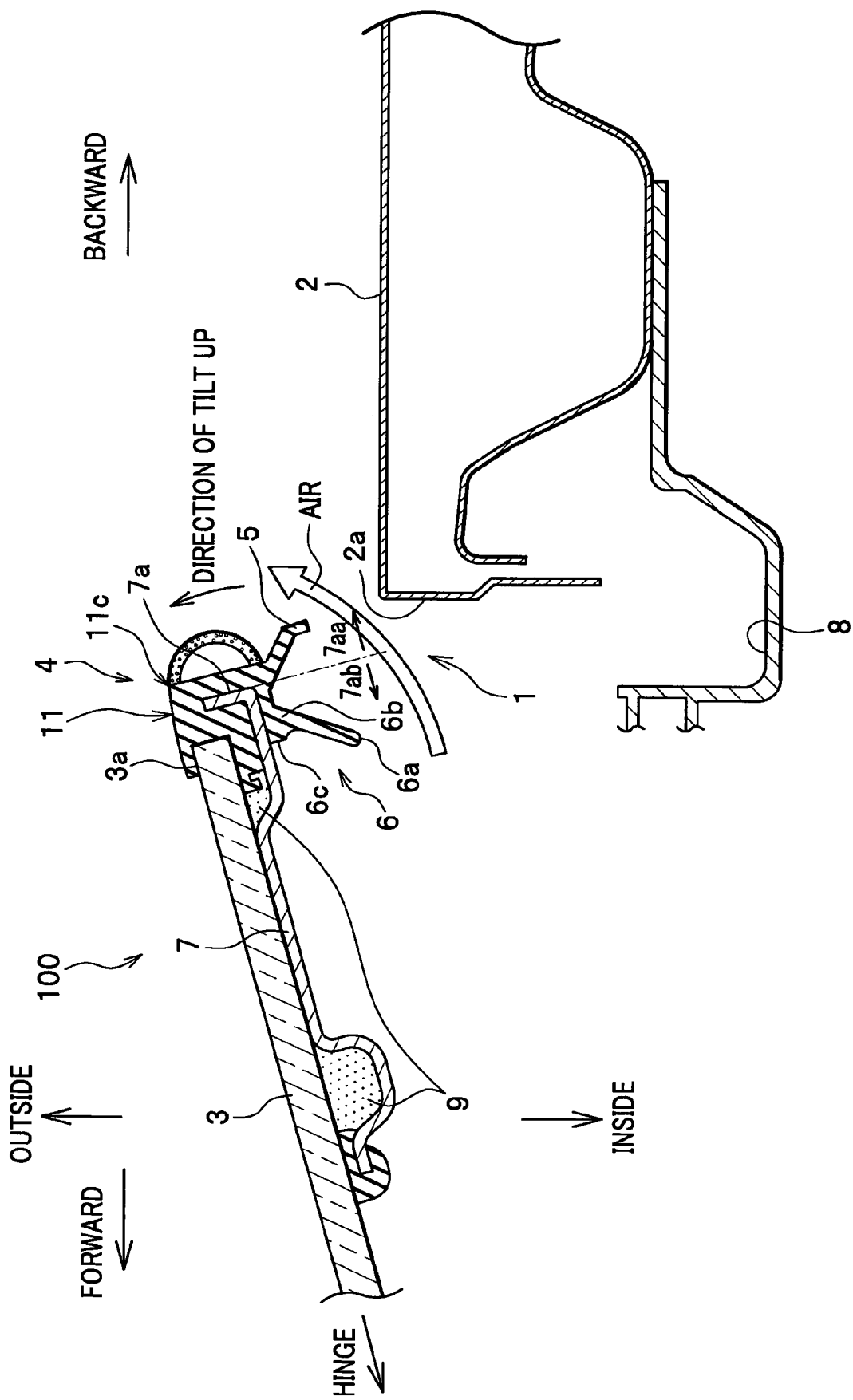
FIG. 2 is a cross sectional view showing area A in FIG. 1 as seen from the side direction of vehicle.
Figure 3A:
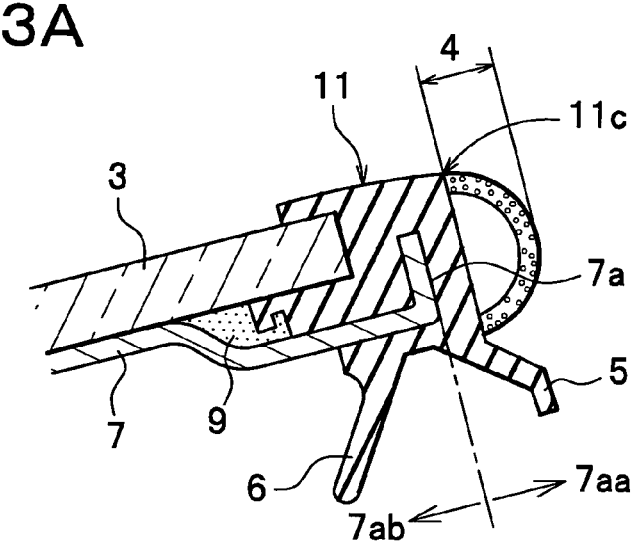
FIG. 3A is a sectional view showing a sealing mechanism according to the present invention.

As shown in FIGS. 2 and 3A, major components for sealing the sunroof panel 3 include a panel holder 7, a lip member 11, a sealing member 4 and a lip 6 for wind noise. The panel holder 7 internally supports the sunroof panel 3 relative to the cabin of a vehicle. The lip member 11 is disposed at an end portion 7a of the panel holder 7. The sealing member 4 is attached to the lip member 11. The lip 6 extends from the lip member 11 towards the inside of cabin. An end portion 6a of the lip 6 is adapted to lie closer to the sunroof panel 3 than the end portion 7a of panel holder 7. In other words, the end portion 6a lies in an inner portion 7ab relative to the end portion 7a. The sealing member 4 is attached to the lip member 11 at a joint 11c.

The arrangement described above provides a less steep reduction in volume of the passage for air flow by introduction of the lip 6 during tilting-up of the sunroof panel 3. In this way, it is possible to decrease noise which is induced by a stream of air drawn from the inside of vehicle.

A lip 5 for water drainage, which is integrally formed with the lip 6 for wind noise, extends from the lip member 11. The lip 5 is adapted to lie closer to the sealing member 4 than the lip 6. In other words, the lip 5 lies in an outer portion 7aa relative to the end portion 7a. Furthermore, the lip 5 lies closer to the cabin of vehicle than the sealing member 4 does, extending diagonally like a tongue relative to the outer periphery of sunroof panel 3. And a channel 8 for water drainage, which is positioned under the lip 5, drains drops of rainwater The integrally formed lips 5 and 6 (lip member 11) are connected to an end portion 3a of the sunroof panel 3. The lip 5 is positioned inside relative to an inner wall surface 2a of the opening 1 so that it does not interfere with the inner wall surface 2a when the sunroof panel 3 is tilted up.

In this way, it is possible not only to prevent rainwater from dropping into the cabin, but also to increase stiffness of a root 6b of the lip 6 because of the integrated formation. Further more it is possible to help to securely attach the sealing member 4 to the panel holder 7 through the lip member 11.

In addition, the root 6b has a portion 6c of reinforcement which lies on a side closer to the sunroof panel 3.

This also contributes to an increase of stiffness for the root 6b, resulting in more secure attachment of the sealing member 4 to the panel holder 7.

Because the lip 6, which is adapted to lie closer to the sunroof panel 3 (in the inner portion 7ab) than the end portion 7a of panel holder 7, is remotely disposed relative to the joint 11c (mating and adhesion) between the sealing member 4 and the lip member 11, it is possible to further increase the stiffness of the lip 6.

The sunroof panel 3 is securely attached to the panel holder 7 with an adhesive 9.

Next, description is given of mechanism for reduction of noise carried out by the sunroof apparatus 100 which has the arrangement described above.

As shown in FIG. 2, when the sunroof panel 3 is tilted up, air inside the cabin of a vehicle is expelled through a passage defined by the sunroof panel 3 and the edge of opening 1, inducing noise. It is possible to decrease the noise by introduction of the lip 6 for wind noise, which controls flow of the air.

In addition, because the end portion 6a of lip 6 is adapted to lie slightly inside the end portion 3a of sunroof panel 3, it is possible to provide a less steep reduction in volume of the passage for air flow, which leads to a reduction in noise.

b. Second Embodiment

A second embodiment of the present invention is described with reference to the accompanying drawing.

Figure 3B:
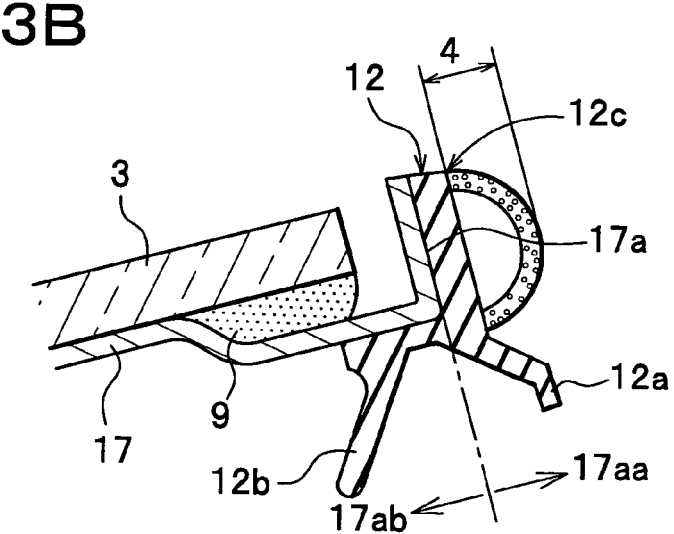
FIG. 3B is a sectional view showing a sealing mechanism according to the present invention.

As shown in FIG. 3B, the second embodiment is basically the same as the first embodiment except for the way of attachment of a lip member 12. In the second embodiment, the lip member 12 is attached to an end portion 17a of a panel holder 17. In FIG. 3B, symbol 12c represents a joint, 12a a lip for water drainage, 12b a lip for wind noise, 17aa an outer portion and 17ab an inner portion, respectively.

c. Third Embodiment

A third embodiment of the present invention is described with reference to the accompanying drawing.

Figure 3C:
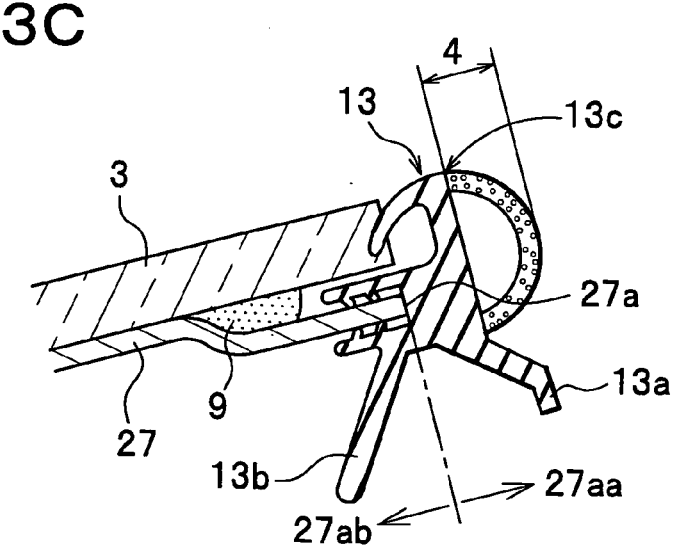
FIG. 3C is a sectional view showing a sealing mechanism according to the present invention.
Figure 4:
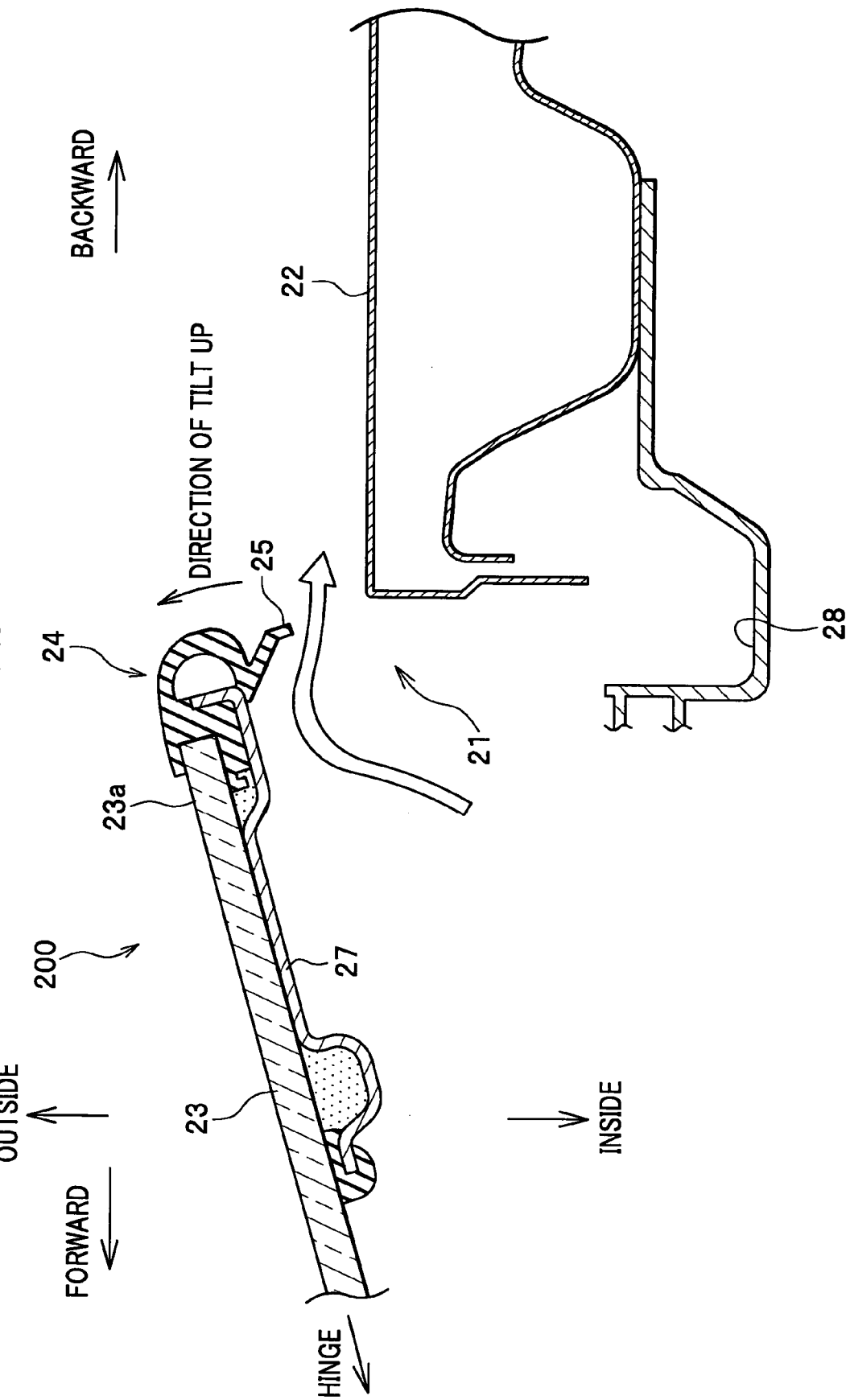
FIG. 4 is a sectional view showing a conventional sealing mechanism used for a sunroof panel.

As shown in FIG. 3C, the third embodiment is basically the same as the first embodiment except for the way of attachment of a lip member 13. In the third embodiment, the lip member 13 is attached to an end portion 27a of a panel holder 27. In FIG. 3C, symbol 13c represents a joint, 13a a lip for water drainage, 13b a lip for wind noise, 27aa an outer portion and 27ab an inner portion, respectively.

While the invention has been described in detail and with reference to specific embodiments thereof, it will be apparent to one skilled in the art that various changes and modifications can be made therein without departing from the spirit and scope thereof.

Although the length of a lip for wind noise is greater than that of a lip for water drainage in the embodiments described above, it may be alternatively possible to select an arbitrary length, the same or smaller length, as long as a lip for wind noise controls air flow passing through an opening for sunroof. Also it may be possible to adopt one-piece assembly integrating a sealing member and lip member in the same material, instead of the embodiments described above, which have an independent sealing member and lip member that are mechanically connected to each other.

Foreign priority document, JP2004-111425, filed on Apr. 5, 2004, is hereby incorporated by reference.

What is claimed is:

1. A sunroof apparatus for a vehicle comprising:
   a sunroof panel;
   a panel holder which supports the sunroof panel internally relative to a cabin of the vehicle;
   a lip member which is attached to an end portion of the panel holder;
   a sealing member which is attached to the lip member; and
   a lip for wind noise which extends from the lip member towards inside of the cabin;
   wherein an end portion of the lip for wind noise is adapted to lie in an inner portion relative to the end portion of the panel holder; and
   wherein the lip for wind noise extends away from where the lip member is attached to the end portion of the panel holder so that the lip for wind noise is able to move freely relative to the panel holder.

2. A sunroof apparatus according to claim 1 further comprising a lip for water drainage, which is integrally formed with the lip for wind noise and extends from the lip member towards inside of the cabin, wherein the lip for water drainage is adapted to lie closer to the sealing member than the lip for wind noise.

3. A sunroof apparatus according to claim 1, wherein the lip for wind noise has a portion of reinforcement at a root thereof, the portion being adapted to lie on a side closer to the sunroof panel.

4. A sunroof apparatus according to claim 1, wherein the lip for wind noise is adapted to lie in an inner portion relative to the end portion of the panel holder.

5. A sunroof apparatus according to claim 1, wherein the lip member and the sealing member are integrally formed into one piece.

6. A sunroof apparatus for a vehicle comprising:
   a sunroof panel;
   a panel holder which supports the sunroof panel internally relative to a cabin of the vehicle;
   a lip member which is attached to an end portion of the panel holder;
   a sealing member which is attached to the lip member;
   a lip for wind noise which extends from the lip member towards inside of the cabin; and
   a lip for water drainage, which is integrally formed with the lip for wind noise and extends from the lip member towards inside of the cabin, the lip for water drainage being adapted to lie closer to the sealing member than the lip for wind noise, wherein an end portion of the lip for wind noise is adapted to lie in an inner portion relative to the end portion of the panel holder; and wherein the lip for wind noise diagonally extends like a tongue inward relative to the sunroof panel and the lip for water drainage extends diagonally like a tongue outward relative to the sunroof panel.

* * * * *